(12) United States Patent  (10) Patent No.: US 12,162,402 B2
Adamczyk  (45) Date of Patent: Dec. 10, 2024

(54) NON-CONTACTING TRAILER HITCH DETECTOR ASSEMBLY

(71) Applicant: ADAC Plastics, Inc., Grand Rapids, MI (US)

(72) Inventor: Anne Adamczyk, Grand Rapids, MI (US)

(73) Assignee: ADAC Plastics, Inc., Grand Rapids, MI (US)

( * ) Notice: Subject to any disclaimer, the term of this patent is extended or adjusted under 35 U.S.C. 154(b) by 552 days.

(21) Appl. No.: 17/515,858

(22) Filed: Nov. 1, 2021

(65) Prior Publication Data
US 2022/0186541 A1 Jun. 16, 2022

Related U.S. Application Data

(60) Provisional application No. 63/125,061, filed on Dec. 14, 2020.

(51) Int. Cl.
*B60Q 1/30* (2006.01)
*B60D 1/62* (2006.01)

(52) U.S. Cl.
CPC .............. *B60Q 1/305* (2013.01); *B60D 1/62* (2013.01)

(58) Field of Classification Search
CPC .......... B60D 1/06; B60D 1/485; B60Q 1/305; E05Y 2900/546; E05Y 2900/544; B60W 2300/14
See application file for complete search history.

(56) References Cited

U.S. PATENT DOCUMENTS

| | | | |
|---|---|---|---|
| 6,285,278 B1 | 9/2001 | Schutt et al. | |
| 2003/0098786 A1 | 5/2003 | Bishop | |
| 2007/0241869 A1 | 10/2007 | Kalous | |
| 2010/0109368 A1 | 5/2010 | Marshall | |
| 2013/0253814 A1 | 9/2013 | Wirthlin | |
| 2014/0249723 A1* | 9/2014 | Pilutti | B60W 30/00 701/42 |
| 2015/0035253 A1* | 2/2015 | Materna | B60D 1/62 280/477 |
| 2020/0114711 A1 | 4/2020 | Nixon | |
| 2020/0198421 A1 | 6/2020 | Reed et al. | |
| 2020/0384818 A1* | 12/2020 | Giaier | G01L 5/00 |
| 2021/0206218 A1* | 7/2021 | Muddasani | B62D 33/0273 |
| 2023/0322167 A1* | 10/2023 | Brasier | B60R 11/04 348/148 |

* cited by examiner

*Primary Examiner* — Mirza F Alam
(74) *Attorney, Agent, or Firm* — Barnes & Thornburg LLP

(57) ABSTRACT

A trailer hitch detection system may include a sensor mounted in or over an opening defined through a wall of a trailer hitch receiver mounted to a motor vehicle, the sensor configured to be responsive to receipt of a trailer hitch assembly in the trailer hitch receiver to exhibit at least a first sensor characteristic, and to absence of the trailer hitch assembly in the trailer hitch receiver to exhibit at least a second sensor characteristic discernably different from the first sensor characteristic, and signal processing circuitry operatively coupled to the sensor and configured to produce at least one trailer hitch detection signal indicating receipt of the trailer assembly in the trailer hitch receiver in response to the first sensor characteristic and indicating absence of the trailer hitch assembly in the trailer hitch receiver in response to the second sensor characteristic.

20 Claims, 8 Drawing Sheets

NON-CONTACTING TRAILER HITCH DETECTOR ASSEMBLY

CROSS-REFERENCE TO RELATED APPLICATIONS

This application claims the benefit of and priority to U.S. Provisional Patent Application Ser. No. 63/125,061, filed Dec. 14, 2020, the disclosure of which is expressly incorporated herein by reference in its entirety.

TECHNICAL FIELD

The present disclosure relates generally to trailer hitch assemblies receivable in trailer hitch receivers mounted to motor vehicles, and further to non-contacting structures and techniques for detecting receipt of trailer hitch assemblies in trailer hitch receivers.

BACKGROUND

Motor vehicles may be equipped with trailer hitch receivers configured to receive trailer hitch assemblies therein for the purpose of towing trailers and/or other vehicles. Some such motor vehicles are so equipped when new, and other such motor vehicles are equipped with aftermarket receivers and assemblies.

SUMMARY

The present disclosure may comprise one or more of the features recited in the attached claims, and/or one or more of the following features and combinations thereof. In one aspect, a trailer hitch detection system for a motor vehicle may comprise a sensor mounted in or over an opening defined through a wall, and into an interior, of a trailer hitch receiver mounted to the motor vehicle, the sensor configured to be responsive to receipt of a trailer hitch assembly in the trailer hitch receiver to exhibit at least a first sensor characteristic, and to an absence of the trailer hitch assembly in the trailer hitch receiver to exhibit at least a second sensor characteristic discernably different from the first sensor characteristic, and signal processing circuitry operatively coupled to the sensor and configured to produce at least one trailer hitch detection signal, the at least one trailer hitch detection signal indicating receipt of the trailer assembly in the trailer hitch receiver in response to the first sensor characteristic and indicating absence of the trailer hitch assembly in the trailer hitch receiver in response to the second sensor characteristic.

In another aspect, a trailer hitch detection system for a motor vehicle may comprise a sensor mounted in or over an opening defined through a wall, and into an interior, of a trailer hitch receiver mounted to the motor vehicle, the sensor configured to be responsive to receipt of a trailer hitch assembly in the trailer hitch receiver to produce at least a first sensor characteristic, and to an absence of the trailer hitch assembly in the trailer hitch receiver to produce at least a second sensor characteristic discernably different from the first sensor characteristic, signal processing circuitry operatively coupled to the sensor and configured to produce at least a first trailer hitch detection signal in response to the first sensor characteristic and to produce at least a second trailer hitch detection signal, distinguishable from the first trailer hitch detection signal, in response to the second sensor characteristic, at least one notification device, and at least one processor or controller responsive to at least one of the first trailer hitch detection signal and the second trailer hitch detection signal to control the at least one notification device to provide a notification of a respective one of receipt of a trailer hitch assembly in the trailer hitch receiver and an absence of a trailer hitch assembly in the trailer hitch receiver.

In a further aspect, a trailer hitch detection system for a motor vehicle may comprise a sensor mounted in or over an opening defined through a wall, and into an interior, of a trailer hitch receiver mounted to the motor vehicle, the sensor configured to be responsive to receipt of a trailer hitch assembly in the trailer hitch receiver to produce at least a first sensor characteristic, and to an absence of the trailer hitch assembly in the trailer hitch receiver to produce at least a second sensor characteristic discernably different from the first sensor characteristic, signal processing circuitry operatively coupled to the sensor and configured to produce at least a first trailer hitch detection signal in response to the first sensor characteristic and to produce at least a second trailer hitch detection signal, distinguishable from the first trailer hitch detection signal, in response to the second sensor characteristic, at least one drive motor for driving a power tailgate assembly operatively mounted to the motor vehicle between a closed position and one or more open positions, wherein at least one component of the power tailgate assembly in at least one of the one or more open positions of the power tailgate assembly will contact the trailer hitch assembly received in the trailer hitch receiver, a switch or detector responsive to manual user activation to produce at least one tailgate activation signal to command the power tailgate assembly to the closed or any of the one or more open positions, at least one processor or controller configured to be responsive to the first trailer hitch detection signal and to the at least one tailgate activation signal corresponding to a command of the power tailgate assembly to the at least one open position to disable the at least one drive motor from driving the power tailgate assembly to the at least one position.

DESCRIPTION OF THE ILLUSTRATIVE EMBODIMENTS

For the purposes of promoting an understanding of the principles of this disclosure, reference will now be made to a number of illustrative embodiments shown in the attached drawings and specific language will be used to describe the same.

This disclosure relates to sensors, devices, modules, systems and techniques for determining, in a non-contacting manner, the presence of a trailer hitch assembly received within a trailer hitch receiver operatively mounted to a motor vehicle and the absence thereof. Various motor vehicle actuators, systems and/or features may illustratively be controlled based on such a determination, and any such vehicle actuator, system and/or feature control arrangement is contemplated by this disclosure. One example such actuator, system or feature control arrangement, which should not be considered to be limiting in any way, is illustrated in the attached drawings and described herein in the context of a motor vehicle, e.g., a flatbed pickup truck, having a power tailgate assembly operatively and movably mounted thereto, and the control arrangement is illustratively in the form of a sensor module and system responsive to detection of a trailer hitch assembly received within a trailer hitch receiver to prevent actuation of the power tailgate assembly to at least one open position thereof.

Figure 1A:
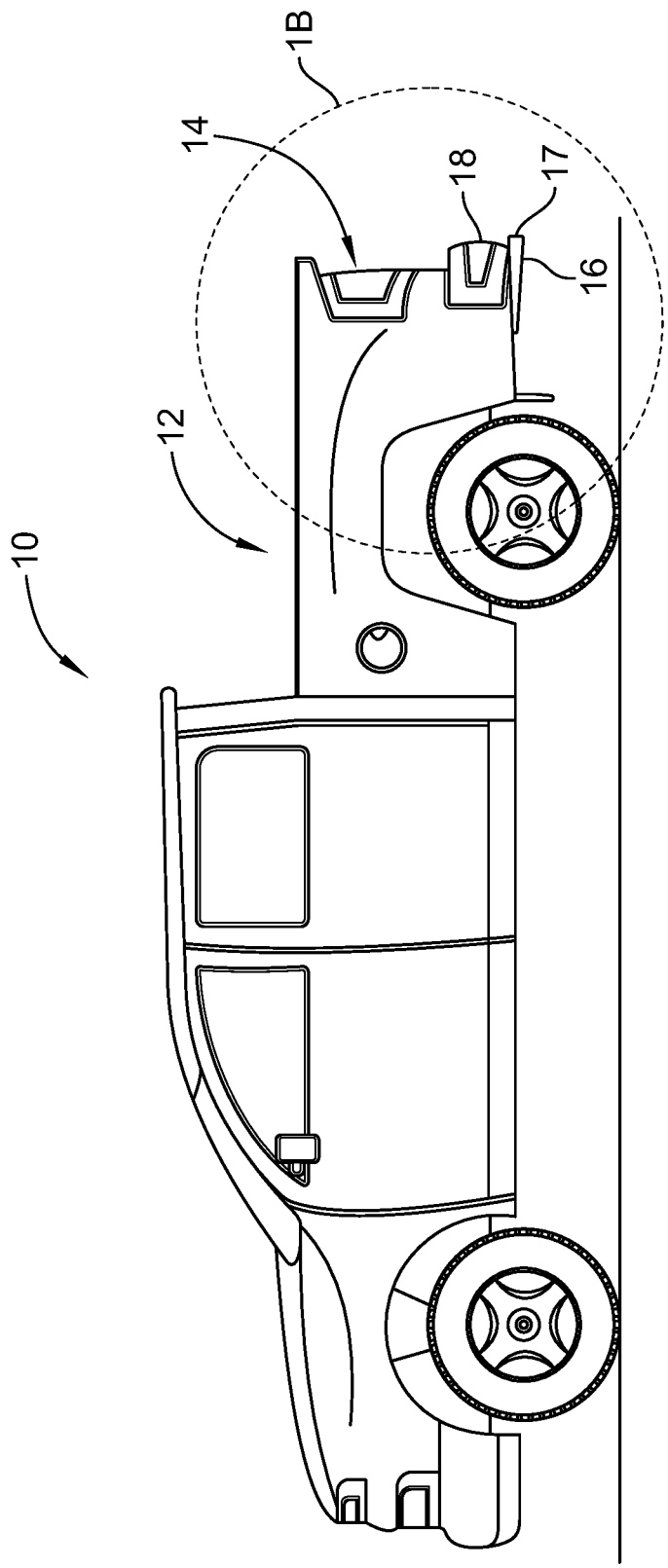
FIG. 1A is a side elevational view of a conventional flatbed pickup truck having an example power tailgate assembly operatively mounted thereto and shown in a closed position thereof, and having embodiment of a trailer hitch detector assembly operatively mounted to a trailer hitch receiver fixed to a frame of the truck.
Figure 1B:
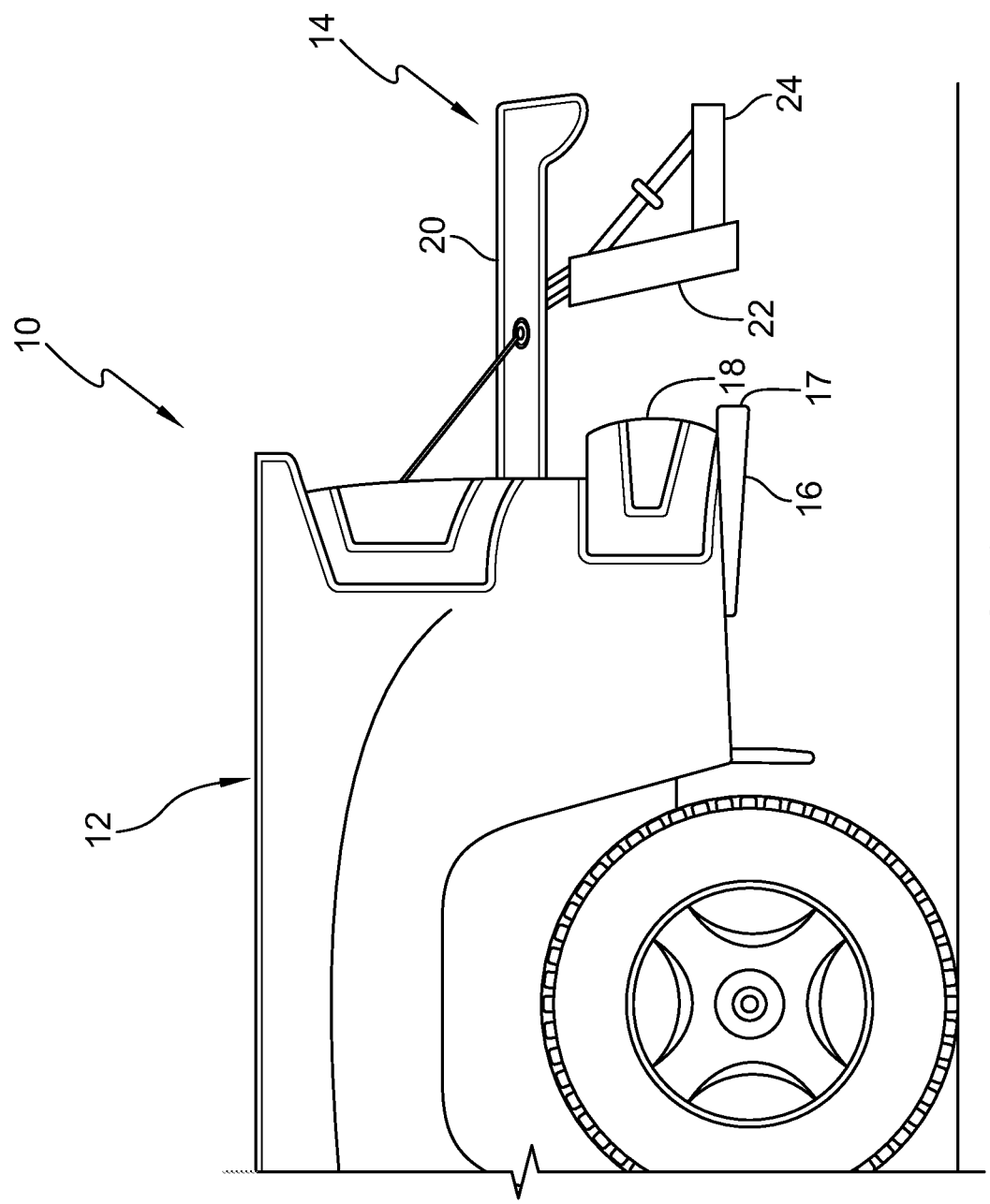
FIG. 1B is a magnified view of the circled portion 1B of the truck of FIG. 1A illustrating the power tailgate assembly in an example open or deployed position thereof.

Referring now to FIGS. 1A and 1B, side elevational views are shown of a conventional flatbed pickup truck 10 having a truck bed 12, including a floor, opposing sides extending upwardly from the floor and a rear panel coupled to the sides and floor and defining an opening therebetween which is open to a rear portion of the truck bed 12, with an example power tailgate assembly 14 operatively mounted thereto. As is conventional, the tailgate assembly 14 is movably, e.g., pivotably, mounted to the rear panel of the truck bed 12 over the opening to the rear portion of the truck bed 12. In the illustrated embodiment, a trailer hitch receiver 16 is mounted to an underside of the truck bed 12, e.g., via a conventional cross-bar to one or more frame or chassis components of the truck 12, and a rear bumper 18 is shown mounted to and across a rear portion of the truck 10 between the attachment points of the tailgate assembly 14 to the truck bed 12 and the trailer hitch receiver 16. The trailer hitch receiver 16 is conventional, and is illustratively an elongated structure defining an open end 17 and an elongated passageway or channel 26 extending at least partially therein in the longitudinal direction from the open end 17. The open end 17 generally faces outwardly away from the truck 12 as illustrated in FIGS. 1A-1B. In some embodiments, the passageway 26 is generally square-shaped in transverse cross-section, although other non-square shapes are possible and are contemplated by this disclosure. In any case, the passageway 26 is generally shaped and configured to receive, via the open end 17, a complementarily shaped and configured ball mount of a trailer hitch assembly (see, e.g., FIGS. 2A-2B). Illustratively, one or more modifications may be made to the trailer hitch receiver 16 to accommodate operative mounting thereto of a trailer hitch detector assembly (see, e.g., FIGS. 3-6C).

In the example depicted in FIG. 1A, the power tailgate assembly 14 is in a closed position, and in FIG. 1B the power tailgate assembly 14 in an open or deployed position. As illustrated by example in FIG. 1B, the example power tailgate assembly 14 illustratively includes a primary tailgate 20 movably, e.g., pivotably, mounted to the rear panel of the truck bed 12 over the opening thereto, a foldable gate 22 movably, e.g., pivotably, mounted to the primary tailgate 20, and a foldable step 24 movably, e.g., pivotably, mounted to the gate 22. In some embodiments, the foldable gate 22 is separate from the primary tailgate 20 and is received, in a closed position thereof, within a pocket defined in the outer surface of the primary tailgate 20. In alternate embodiments, the foldable gate 22 may be or include an upper portion of the primary tailgate 20. Likewise, in some embodiments the foldable step 24 may be separate from the foldable gate 22, and in alternate embodiments the foldable step 24 may be or include a portion of the foldable gate 22. In any case, each of the primary tailgate 20, the foldable gate 22 and the foldable step 24 is movable, relative to the respective structure to which it is movably mounted, between open and closed positions. Accordingly, it should be understood that the tailgate assembly 14 may have a number of different open positions; e.g., primary tailgate open with foldable gate and foldable step both closed, primary tailgate open with foldable gate open and foldable step closed, and primary tailgate open with foldable gate and foldable step both open, this latter open position being depicted by example in FIG. 1B.

Figure 2A:
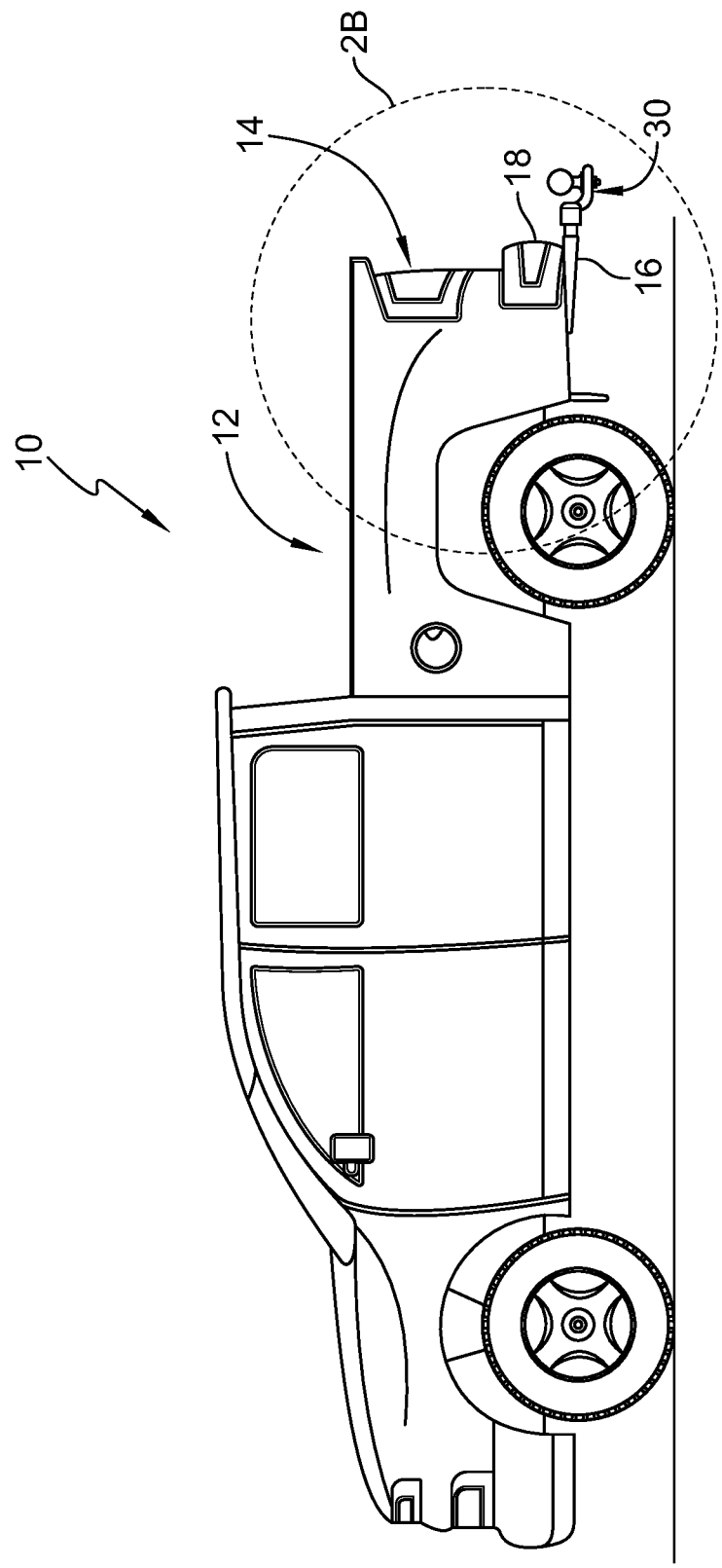
FIG. 2A is a side elevational view of the truck of FIG. 1A shown with the power tailgate assembly in the closed position and shown with a trailer hitch assembly operatively mounted to the trailer hitch receiver.
Figure 2B:
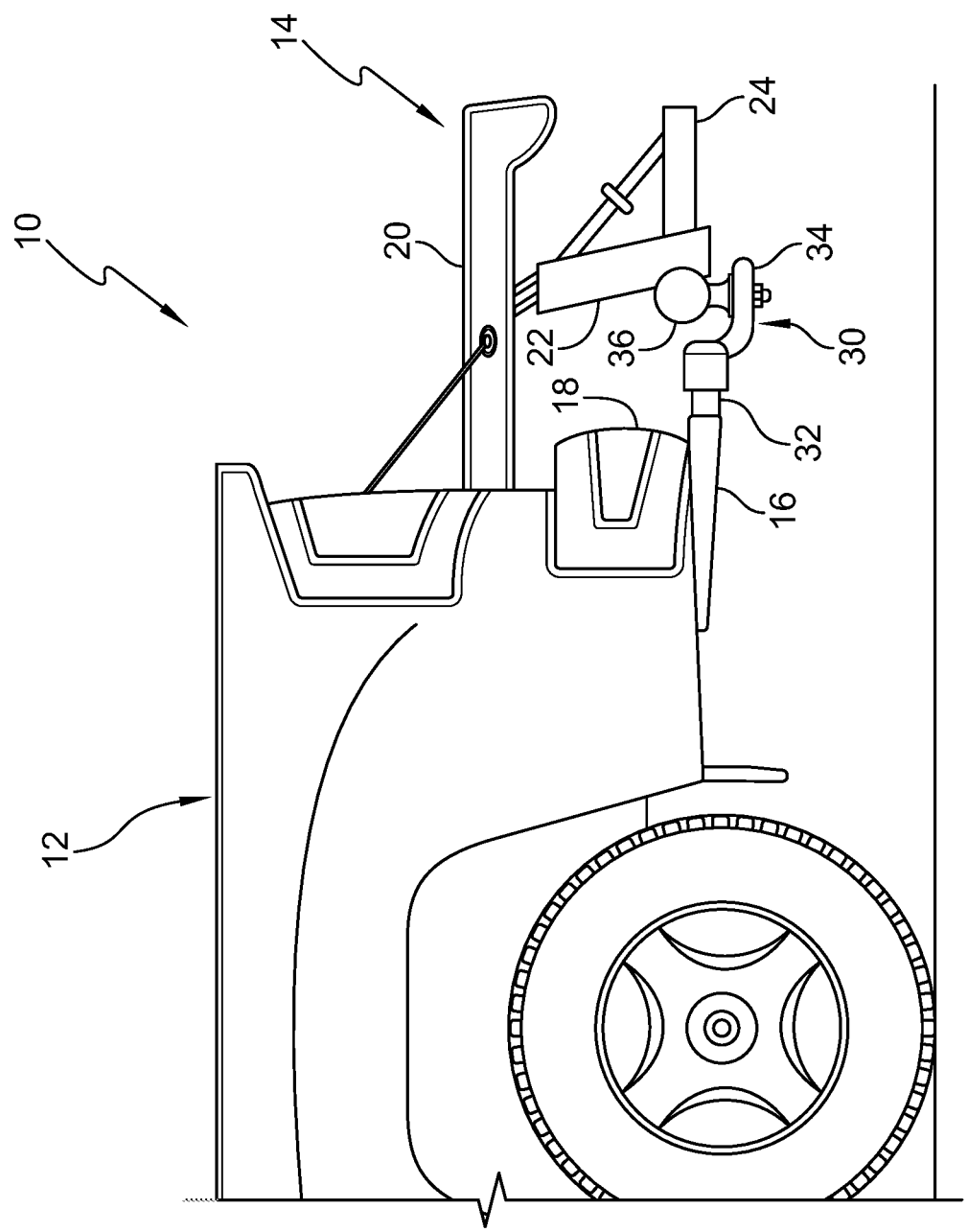
FIG. 2B is a magnified view of the circled portion 2B of the truck of FIG. 2A with the power tailgate assembly in the deployed position of FIG. 1B and illustrating contact between a portion of the power tailgate assembly and the hitch ball of the trailer hitch assembly as may occur without the trailer hitch detector assembly operatively mounted to the trailer hitch receiver.

Referring now to FIGS. 2A and 2B, the truck 10 of FIGS. 1A and 1B are respectively shown as depicted in FIGS. 1A and 1B but with a trailer hitch assembly 30 operatively mounted to the trailer hitch receiver 16. In the illustrated embodiment, the trailer hitch assembly 30 illustratively includes an elongated ball mount (or hitch bar or shank) 32 sized and configured to be received through the opening 17 and into the passageway or channel 26 of the trailer hitch receiver 16 to thereby mount the trailer hitch assembly 30 to the trailer hitch receiver 16. The ball mount 32 is illustratively shaped and configured in transverse cross-section complementarily to, yet somewhat smaller than, that of the passageway or channel 26 defined longitudinally into the trailer hitch receiver 16 such that the ball mount 32 can be slidingly received within the passageway or channel 26 via the opening 17. Although not shown in the figures, the trailer hitch receiver 16 and the ball mount 32 may both be configured to receive a conventional locking pin or other locking structure to detachably fix the ball mount 32, and thus the trailer hitch assembly 30, to the trailer hitch receiver 16. The ball mount 32 illustratively includes a hitch ball mounting portion 34 coupled thereto or integral therewith. In the illustrated embodiment, the hitch ball mounting portion 34 is vertically offset lower than the ball mount 32, although in other embodiments the hitch ball mounting portion 34 may be vertically offset higher than the ball mount or co-planar with the ball mount 32. In any case, a conventional ball hitch 36 is mounted in a conventional manner to the ball hitch mounting portion 34 of the ball mount 32. In one embodiment, the trailer hitch receiver 16 and all of the components of the trailer hitch assembly 30 are formed of a conventional metal composite, e.g., steel, although in alternate embodiments one or more of the components of the trailer hitch assembly 30, e.g., the ball hitch 36, may be formed of other materials.

With the trailer hitch assembly 30 operatively mounted to the trailer hitch receiver 16 as described above and illustrated by example in FIG. 2A, the foldable gate 22 may come into contact with the hitch ball 36 as the tailgate assembly 14 is opened to certain open positions thereof, e.g., with the primary tailgate 20 and the foldable gate 22 both open (and regardless of the position of the foldable step 24 relative to the foldable gate 22), as illustrated by example in FIG. 2B. In this regard, a trailer hitch detector assembly 60 operatively mounted to the trailer hitch receiver 16, as illustrated in various example embodiments depicted in FIGS. 6A-6C and described below, is illustratively configured to produce one or more signals from which it can be discerned whether a trailer hitch assembly 30 is mounted to the trailer hitch receiver 16, and such one or more signals may then be used in a control arrangement to prevent powered opening of the tailgate assembly 14 to certain open positions thereof when the trailer hitch assembly 30 is detected as being mounted to the trailer hitch receiver 16.

Figure 3:
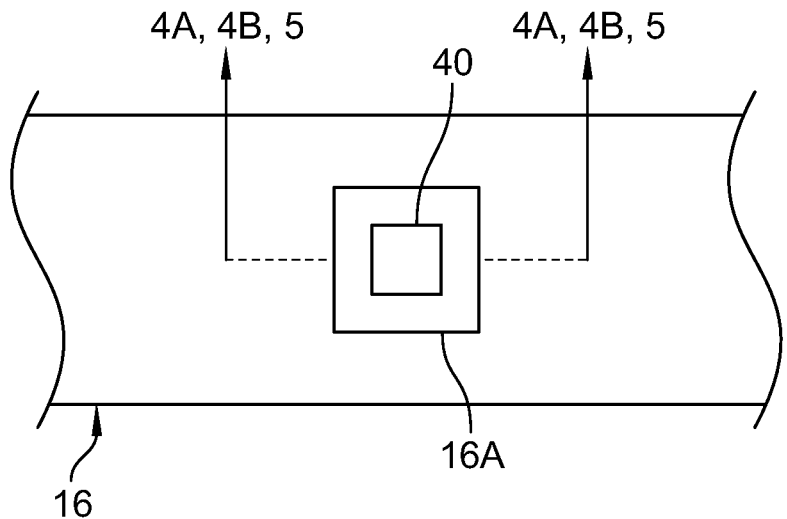
FIG. 3 is a simplified diagram of an embodiment of a sensor positioned within an opening defined through a wall of the trailer hitch receiver.

Referring now to FIG. 3, a simplified diagram is shown of an embodiment of a sensor 40 positioned within an opening 16A defined through a wall of the trailer hitch receiver 16. The sensor 40 is illustratively configured to have one or more sensor characteristics which discernably change with a trailer hitch assembly 30 operatively mounted to the trailer hitch receiver 16 as compared to no trailer hitch assembly 30 being operatively mounted to the trailer hitch receiver 16. In particular, the sensor exhibits a first one or more sensor characteristic(s) with no ball mount 32 received in the passageway or channel 26 via the opening 17 of the trailer hitch receiver 16 or with a ball mount 32 received partially into the passageway or channel 26 but not far enough to have any portion thereof positioned opposite to the sensor 40, and exhibits a second one or more sensor characteristic(s), discernable from the first one or more sensor characteristic(s), with the ball mount 32 received sufficiently far into the passageway or channel 26 to have at least a portion thereof positioned opposite to the sensor 40. It will be understood that the opening 16A is defined completely through a wall of the trailer hitch receiver 16 so that the opening 16A is open to both an outer wall 16B of the trailer hitch receiver 16 and an inner wall 16C thereof, wherein the inner wall 16C defines an outer periphery of the passageway or channel 26 defined longitudinally through the trailer hitch receiver 16. It will be understood that with the ball mount 32 received within the passageway or channel 26 sufficiently far to secure the trailer hitch assembly 30 to the trailer hitch receiver 16 for purposes of towing another vehicle, the outer surface of the ball mount 32 will span the opening 16A as illustrated by example in FIGS. 4B and 5.

Figure 4A:
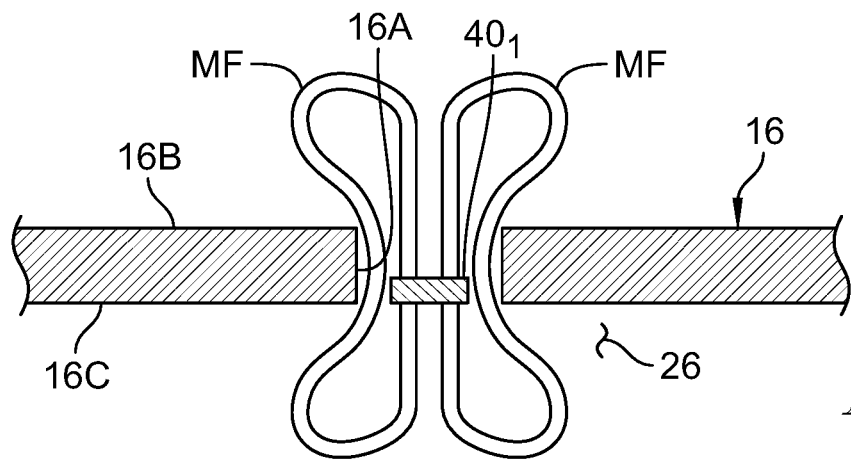
FIG. 4A is a cross-sectional view of the trailer hitch receiver and an embodiment of the sensor of FIG. 3, as viewed along section lines 4A,4B,5-4A,4B,5 thereof, illustrating a magnetic field extending from the sensor positioned in the opening defined through the wall of the trailer hitch receiver.
Figure 4B:
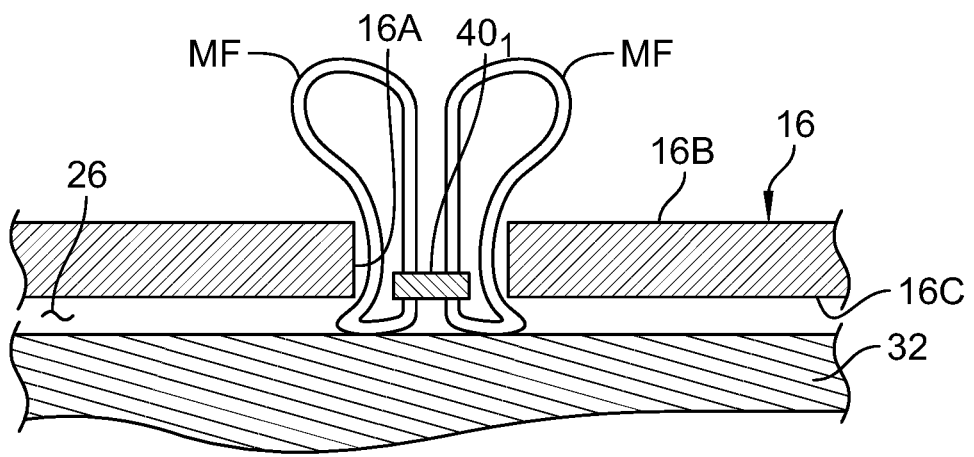
FIG. 4B is a cross-sectional view similar to FIG. 4A with a shank of the trailer hitch assembly of FIGS. 2A and 2B received within the trailer hitch receiver, and illustrating an effect of the shank on the magnetic field of FIG. 3 so as to produce a detectable difference in the sensor characteristics, as compared with FIG. 4A, with the shank received within the trailer hitch receiver.

Referring now to FIGS. 4A and 4B, an embodiment $40_1$ is shown of the sensor 40 illustratively implemented in the form of a conventional electromagnetic coil sensor. As depicted in the cross-sectional view of FIG. 4A with no trailer hitch assembly 30 mounted to the trailer hitch receiver 16, the coil sensor $40_1$, when activated, produces a magnetic field MF which extends away from the coil sensor $40_1$. It will be understood that the magnetic field illustrated in FIGS. 4A and 4B is greatly exaggerated solely for the purpose of demonstrating operation of the sensor 40. In contrast, as depicted by example in FIG. 4B, with the ball mount 32 of a trailer hitch assembly 30 received within the passageway 26 of the trailer hitch receiver 16, eddy currents from the magnetic field of the coil sensor $40_1$ are induced in the electrically conductive ball mount 32 opposite the opening 16A, which causes the strength of the magnetic field to increase and, in turn, causes the inductance of the coil sensor $40_1$ to decrease. This difference in magnetic field strength serves to distinguish between conditions in which no trailer hitch assembly 30 is operatively mounted to the trailer hitch receiver 16, i.e., no ball mount 32 is received sufficiently far into the passageway 26, and conditions in which a trailer hitch assembly 30 is operatively mounted to the trailer hitch receiver 16, i.e., a ball mount 32 is received sufficiently far into the passageway 26. In practice, a conventional oscillator circuit may typically be used to drive the coil sensor $40_1$, wherein the decrease in the inductance of the coil sensor $40_1$, resulting from the increase in strength of the magnetic field due to the presence of the ball mount 32 received within the passageway 26, causes the operating frequency of the oscillator circuit to increase. The operating frequency of the oscillator circuit, in this illustrative embodiment, serves as an indicator of whether or not the ball mount 32 of the trailer hitch assembly 30 is received within the passageway 26 of the trailer hitch receiver 26. In one example embodiment, an operating frequency of the oscillator circuit below a threshold frequency may indicate an absence of the ball mount 32 within the passageway 26, and an operating frequency of the oscillator circuit above the threshold frequency, or above a second greater threshold frequency in the case where hysteresis may be employed, may indicate a presence of the ball mount 32 within the passageway 26. Other circuitry and/or techniques may alternatively or additionally be used to detect changes in the magnetic field produced by the sensor $40_1$ resulting from the presence or absence of the ball mount 32 within the passageway 26, and it will be understood that any such other circuitry and/or techniques are intended to fall within the scope of this disclosure.

Figure 5:
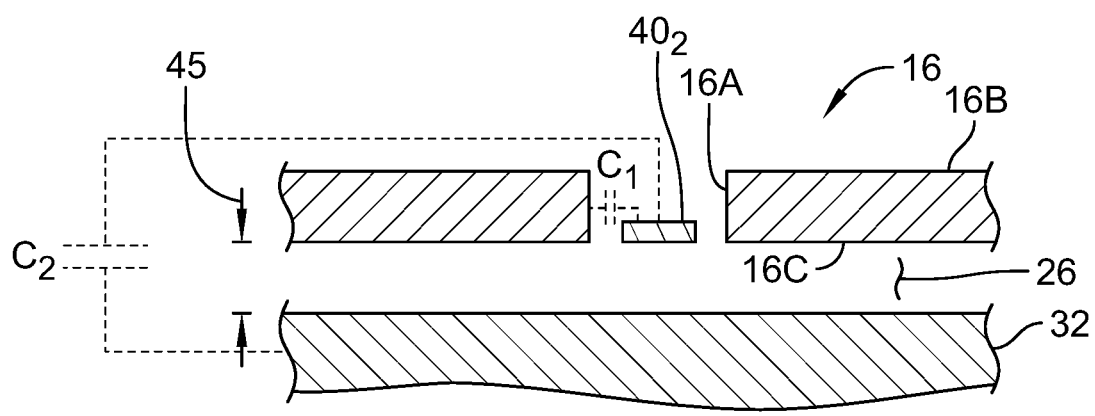
FIG. 5 is a cross-sectional view of the trailer hitch receiver and another embodiment of the sensor of FIG. 3, as viewed along section lines 4A,4B,5-4A,4B,5 thereof, and shown with the shank of the trailer hitch assembly of FIGS. 2A and 2B received within the trailer hitch receiver so as to produce a detectable difference in the sensor characteristics as between the shank received within the trailer hitch receiver and not received within the trailer hitch receiver.

Referring now to FIG. 5, another embodiment $40_2$ is shown of the sensor 40 illustratively implemented in the form of a capacitive proximity sensor having an electrically conductive, e.g., metal, plate or strip, or in the form of an electrically conductive or non-conductive strip to which an electrically conductive film, coating or layer has been applied to an underside thereof, i.e., to part or all of the surface facing the passageway 26 of the trailer hitch receiver 16. In simplistic form, with no trailer hitch assembly 30 mounted to the trailer hitch receiver 16, the plate sensor $40_2$ represents one plate of a capacitor with the side walls of the trailer hitch receiver 16 about the opening 16A defining another conductive surface such that the plate sensor $40_2$ and the trailer hitch receiver 16 define a capacitor $C_1$ therebetween with the air gap between the sensor $40_1$ and the sidewalls of the opening 16A forming the dielectric of $C_1$. With a ball mount 32 of a trailer hitch assembly 30 received within the passageway 26 of the trailer hitch receiver 16, the plate sensor $40_2$ and the electrically conductive surface of the ball mount 32 opposite thereto define another capacitor $C_2$ therebetween with the air gap 45 between the sensor $40_1$ and the opposing surface of the ball mount 32 forming the dielectric of $C_2$. With no ball mount 32 received within the passageway 26, the capacitance, $C_1$ of the plate sensor $40_1$ is thus $C_1$, and with the ball mount 32 received within the passageway 26, the capacitance, C, of the plate sensor $40_2$ is the combination of $C_1$ and $C_2$. This difference in capacitance, C, thus serves to distinguish between conditions in which no trailer hitch assembly 30 is operatively mounted to the trailer hitch receiver 16, i.e., no ball mount 32 is received sufficiently far into the passageway 26, and conditions in which a trailer hitch assembly 30 is operatively mounted to the trailer hitch receiver 16, i.e., a ball mount 32 is received sufficiently far into the passageway 26. In practice, a conventional oscillator circuit may typically be used to drive the plate sensor $40_1$, wherein a change in the capacitance, C, resulting from the presence of the ball mount 32 is detected as a corresponding change in the frequency of the oscillator drive signals. Other circuitry and/or techniques may alternatively or additionally be used to detect changes in the capacitance defined, in part, by the plate sensor $40_1$, and it will be understood that any such other circuitry and/or techniques are intended to fall within the scope of this disclosure.

Figure 6A:
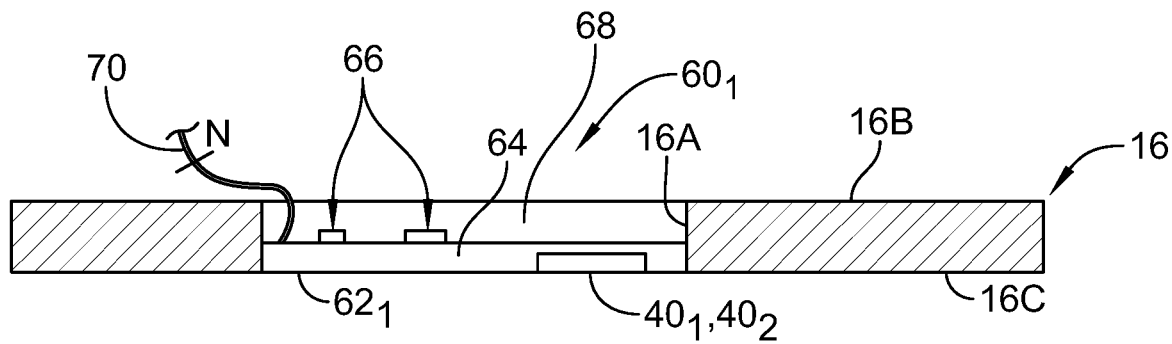
FIG. 6A is a cross-sectional view, similar to FIG. 4A, illustrating an embodiment of a trailer hitch detection module operatively mounted to the trailer hitch receiver.
Figure 6B:
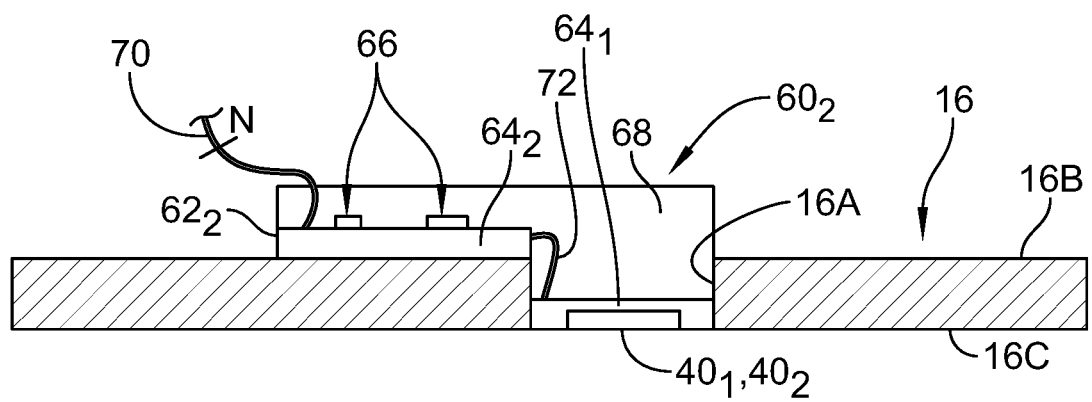
FIG. 6B is a cross-sectional view, similar to FIG. 6A, illustrating another embodiment of a trailer hitch detection module operatively mounted to the trailer hitch receiver.
Figure 6C:
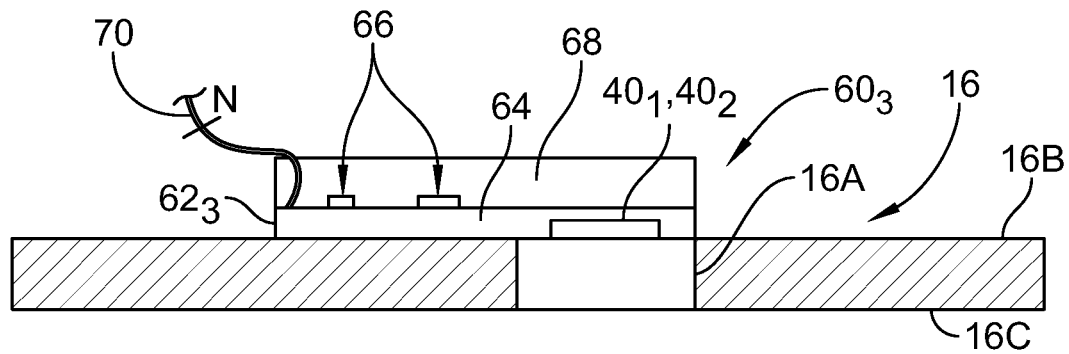
FIG. 6C is a cross-sectional view, similar to FIGS. 6A and 6B, illustrating yet another embodiment of a trailer hitch detection module operatively mounted to the trailer hitch receiver.

Referring now to FIGS. 6A-6C, three different embodiments are shown of a trailer hitch detection module $60_1$, $60_2$, $60_3$ respectively, each operatively mounted to a trailer hitch receiver 16. As briefly described above, each of the trailer hitch detection modules $60_1$, $60_2$, $60_3$ is illustratively configured to produce one or more signals from which it can be discerned whether a trailer hitch assembly 30 is mounted to the trailer hitch receiver 16. In some embodiments, the one or more signals may be used to actuate a notification device, e.g., on-board the motor vehicle carrying the module $60_1$, $60_2$, $60_3$, to notify an operator and/or one or more passengers of the motor vehicle whether a trailer hitch assembly 30 is mounted to the trailer hitch receiver 16. Alternatively or additionally, such one or more signals may be used in a control arrangement to prevent powered opening of a tailgate assembly 14 to certain open positions thereof, e.g., as illustrated by example in FIGS. 1B and 2B, when the trailer hitch assembly 30 is detected as being mounted to the trailer hitch receiver 16.

Referring specifically to FIG. 6A, the trailer hitch detection module $60_1$ includes a housing $62_1$ sized and configured to be received within the opening 16A defined through a wall of the trailer hitch receiver 16. In embodiments in which the trailer hitch receiver 16 is square or rectangular in cross-section, as is conventional, the opening 16A may be defined through any of the four sides. In the embodiment illustrated in FIG. 6A, which should not be considered limiting in any way, the opening 16A is illustratively defined through a top wall of the trailer hitch receiver 16. In any case, the housing $62_1$ is received completely within the opening 16A with a bottom wall or floor of the housing $62_1$ substantially co-planar with an inner surface 16C of the wall of the trailer hitch receiver 16 and with a top of the housing substantially co-planar with an outer surface 16B of the wall of the trailer hitch receiver 16. In the illustrated embodiment, the sensor $40_1$ or the sensor $40_2$ is mounted to an underside of a printed circuit board (PCB) 64 which is itself secured to the floor of the housing $62_1$. Circuit components 66 for controlling the sensor $40_1$ or $40_2$, examples of which are described above, are also operatively mounted to the PCB 64 and one or more of the circuit components 66 is operatively connected to the sensor $40_1$ or $40_2$. Any number, N, of wires or cables 70 extend from the housing $62_1$ and is/are operatively connected to at least one of the components 66 and/or sensor $40_1$ or $40_2$, where N may be any positive integer. A conventional potting compound 68 is illustratively disposed with the housing $62_1$ and formed about the various components contained therein for environmental protection.

Referring now specifically to FIG. 6B, the trailer hitch detection module $60_2$ is similar in many respects to the trailer hitch detection module $60_1$, and like components are therefore used to identify like components. The module $60_2$ illustratively differs from the module $60_1$ in that the housing $62_2$ is substantially L-shaped with a portion of the housing $62_2$ sized and configured to be received within the opening 16A defined through a wall of the trailer hitch receiver 16 with a bottom wall or floor of this portion of the housing $62_1$ substantially co-planar with an inner surface 16C of the wall of the trailer hitch receiver 16, and with another portion of the housing $62_2$ sized and configured to be received on the outer surface 16B of the wall of the trailer hitch receiver 16 adjacent to the opening 16A. In the illustrated embodiment, the sensor $40_1$ or the sensor $40_2$ is mounted to an underside of a printed circuit board (PCB) $64_1$ which is itself secured to the floor of lower portion of the housing $62_2$, i.e., the portion positioned within the opening 16A, and the circuit components 66 are operatively mounted to another PCB $64_2$ which is itself secured to the floor of the upper portion of the housing $62_2$, i.e., the portion positioned on the outer surface 16B of the wall of the trailer hitch receiver 16. One or more wires 72 operatively connect the circuit boards $64_1$, $64_2$, and thus the components 66 and the sensor $40_1$ or $40_2$, to one another, and the number, N, of wires or cables 70 extend from the housing $62_2$ and is/are operatively connected to at least one of the components 66 and/or sensor $40_1$ or $40_2$. The potting compound 68 illustratively fills both portions of the housing $62_2$ and is formed about the various components contained therein for environmental protection.

Referring now specifically to FIG. 6C, the trailer hitch detection module $60_3$ is similar in many respects to the trailer hitch detection modules $60_1$ and $60_2$, and like components are therefore used to identify like components. The module $60_3$ illustratively differs from the module $60_2$ in that the bottom floor of the portion of the housing 623 containing the sensor $40_1$ or $40_2$ entirely fills the opening 16A, i.e., the floor of this portion of the housing extends into the opening 16A from the outer surface 16B of the wall of the trailer hitch receiver 16 to the inner surface 16C of the trailer hitch receiver 16. The remainder of the module $60_3$ is similar to the module $60_1$ in that the sensor $40_1$ or $40_2$ is mounted to a single PCB 64 as are the circuit components 66, and the number, N, of wires or cables 70 extend from the housing 623 and is/are operatively connected to at least one of the components 66 and/or sensor $40_1$ or $40_2$. The potting compound 68 illustratively fills the housing 623 and is formed about the various components contained therein for environmental protection.

Figure 7:
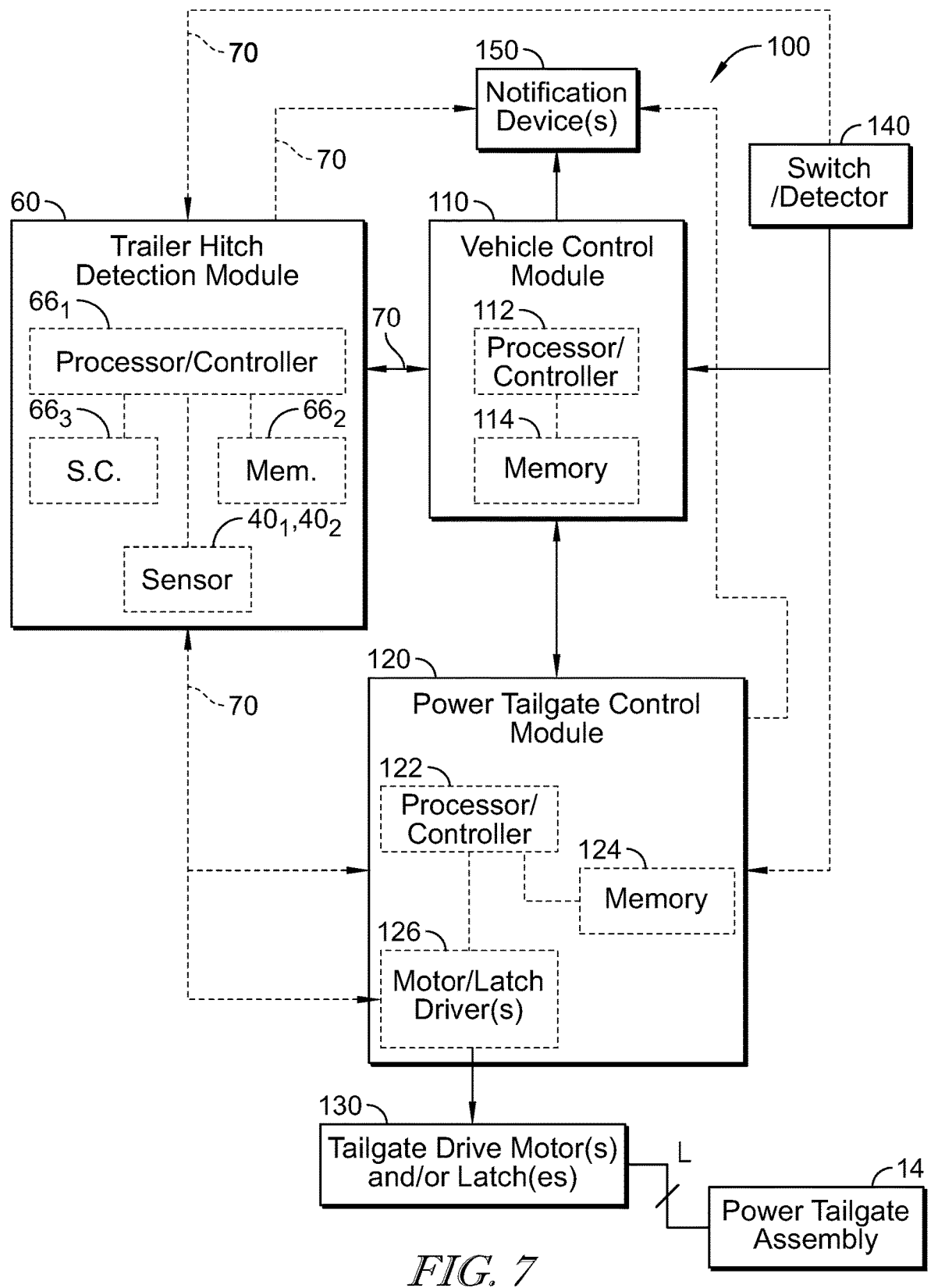
FIG. 7 is a simplified diagram of system for implementing any of the trailer hitch detection modules of FIGS. 6A-6C to provide notification to an operator and/or passenger of a motor vehicle of whether a trailer hitch assembly is received in the trailer hitch receiver and/or to prevent actuation of a power tailgate to at least one open position thereof when a trailer hitch assembly is received in the trailer hitch receiver.

Referring now to FIG. 7, an embodiment is shown of a system 100 for implementing a trailer hitch detection module 60, such as any of the example trailer hitch detection modules $60_1$-$60_3$ illustrated in FIGS. 6A-6C respectively. In some embodiments, the trailer hitch detection module 60 is implemented in the system 100 for the purpose of preventing actuation of a power tailgate assembly, such as the power tailgate assembly 14 illustrated by example in FIGS. 1B and 2B, to at least one open position thereof in which the power tailgate assembly or portion thereof may contact the trailer hitch assembly 30 when received, i.e., installed, inserted or mounted, in the trailer hitch receiver 16. In some such embodiments and/or in other alternate embodiments, the trailer hitch detection module 60 may be implemented in the system 100 for the purpose of providing notification to an operator and/or passenger of a motor vehicle of whether, or not, a trailer hitch assembly 30 is received, i.e., installed, inserted or mounted, in the trailer hitch receiver 16.

In the illustrated embodiment, the trailer hitch detection module 60 may be implemented in any of the forms $60_1$-$60_3$ illustrated by example in FIGS. 6A-6C respectively, or in any other form in which the module 60 is operatively mounted, at least partially, in or over an opening 16A defined through a wall of the trailer hitch receiver 16 such that the sensor $40_1$, $40_2$ of the module 60 is operatively positioned in or over the opening 16A as described above. The circuit components 66 described above with respect to FIGS. 6A-6C illustratively include at least one processor or controller $66_1$ and at least one memory unit $66_2$ operatively coupled thereto, with the remaining circuit components 66 represented as supporting circuitry $66_3$. The processor(s) or controller(s) $66_1$ and the memory unit(s) $66_2$ may be conventional, and the memory unit(s) $66_2$ illustratively has instructions stored therein which are executable by the processor(s) or controller(s) $66_1$ to be responsive to the output signal(s) produced by the sensor $40_1$, $40_2$, as described with respect to FIGS. 3-5, to produce at least one trailer hitch assembly detection signal that is indicative of whether or not the trailer hitch assembly 30 is received, i.e., installed, inserted or mounted, in the trailer hitch receiver 16. In some embodiments, the trailer hitch detection signal(s) may be a single signal having a first state when the output signal(s) produced by the sensor $40_1$, $40_2$ correspond to the presence of the trailer hitch assembly 30 received within the trailer hitch receiver 16, and having a second state, discernable from the first state, when the output signal(s) produced by the sensor $40_1$, $40_2$ correspond to the absence of the trailer hitch assembly 30 within the trailer hitch receiver 16. In other embodiments, the trailer hitch detection signal(s) may include a first one or more signals when the output signal(s) produced by the sensor $40_1$, $40_2$ correspond to the presence of the trailer hitch assembly 30 received within the trailer hitch receiver 16, and a second one or more signals, distinguishable from the first one or more signals, when the output signal(s) produced by the sensor $40_1$, $40_2$ correspond to the absence of the trailer hitch assembly 30 received within the trailer hitch receiver 16. In any case, the supporting circuitry $66_3$ illustratively includes conventional circuitry for controlling, i.e., actuating, the particular sensor $40_1$, $40_2$ as described above with respect to FIGS. 3-5. In some embodiments, the supporting circuitry $66_3$ includes signal processing circuitry for processing output signals produced by the sensor $40_1$, $40_2$ and providing the processed output signals to the processor(s) or controller(s) $66_1$, although in other embodiments the output signals produced by the sensor $40_1$, $40_2$ may be provided directly to the processor or controller $66_1$ (as shown by dashed-line connection in FIG. 7).

In the illustrated embodiment, the trailer hitch detection module 60 is operatively coupled to a vehicle control module 110 via the wires or cables 70. In such embodiments, the module 60 illustratively receives electrical power from the vehicle control module 110 via one or more of the wires or cables 70. In alternate embodiments, the module 60 may be configured to receive electrical power from another source carried by the motor vehicle in which the system 100 is mounted, e.g., the vehicle electrical system or other control module carried by the motor vehicle. In any case, the vehicle control module 110 illustratively includes at least one processor or controller 112 and at least one memory unit 114 operatively coupled thereto. The processor(s) or controller(s) 112 and the memory unit(s) 114 may be conventional, and the memory unit(s) 114 illustratively has instructions stored therein which are executable by the processor(s) or controller(s) 112 to carry out various features associated with the motor vehicle as well as one or more of the features of the system 100 described below.

In embodiments in which the motor vehicle carrying the system 100 has a power tailgate, e.g., such as the power tailgate 14 illustrated by example in FIGS. 1B and 2B, the vehicle control module 110 is operatively coupled to a power tailgate control module 120. In some alternate embodiments, the trailer hitch detection module 60 is operatively coupled to the power tailgate control module 120 via the wires or cables 70 (as shown by dashed-line connection in FIG. 7) instead of, or in addition to, being operatively coupled to the vehicle control module 110. In any case, the power tailgate control module 120 illustratively includes at least one processor or controller 122, at least one memory unit 124 operatively coupled thereto, and at least one driver circuit 126 also operatively coupled to the processor(s) or controller(s) 122. In embodiments in which the power tailgate assembly 14 is motor-driven, one or more tailgate driver motors 130 is/are provided, and the at least one driver circuit 126 is or includes at least one motor driver circuit operatively coupled to the one or more tailgate driver motors 130. In such embodiments, the tailgate driver motor(s) 130 is/are operatively coupled to the power tailgate assembly 14, e.g., via any number, L, of linkages or linkage assemblies, where L may be any positive integer. In some alternate embodiments the power tailgate assembly 14 may not be motor driven and may instead include one or more electrically-controlled latches 130, i.e., one or more power latches, operatively coupled to or mounted to the power tailgate assembly 14 and controllable between a latched state in which the tailgate assembly 14 cannot be opened and an unlatched state in which the tailgate assembly 14 can be opened or automatically drops to an open position. In such embodiments, the at least one driver circuit 126 is or includes at least one latch driver circuit operatively coupled to one or more electrically actuatable tailgate latches 130. In other alternate embodiments, the power tailgate assembly 14 may be latch-driven and motor driven, and in such embodiments one or more tailgate drive motors and one or more latches 130 may be operatively coupled to the power tailgate assembly 14, and the at least one driver circuit 126 may be or include at least one motor driver circuit operatively coupled to the one or more drive motors 130 and one or more latch driver circuit operatively coupled to the one or more power latches 130. In any case, the processor(s) or controller(s) 122, the memory unit(s) 124, the driver circuit(s) 126 and the drive motor(s) and/or latch(es) 130 may all be conventional. The memory unit(s) 124 illustratively has/have instructions stored therein which are executable by the processor(s) or controller(s) 122 to carry out control, i.e., actuation, of the power tailgate assembly 14, i.e., by controlling operation of the tailgate motor(s) and/or latch(es) 130 via control of the driver circuit(s) 126. In some alternate embodiments, the power tailgate control module 120 may be omitted, and the processor(s) or controller(s) 112 of the vehicle control computer 110, or the processor(s) or controller(s) $66_1$ of the trailer hitch detection module 60, may include or be operatively coupled to the motor driver(s) and/or latch(es) 126 as shown by dashed-line representation in FIG. 7.

In embodiments in which the motor vehicle carrying the system 100 has a power tailgate, e.g., such as the power tailgate 14 illustrated by example in FIGS. 1B and 2B, the vehicle control module 110 is further operatively coupled to a switch or detector 140 for actuating the power tailgate assembly 14. In some embodiments, the switch or detector 140 may be provided in the form of at least one switch located in the operator compartment of the motor vehicle and/or adjacent to the tail gate assembly 14, which may be manually actuated to cause the processor(s) or controller(s) 112 of the vehicle control module 110 to control the various positions of the tailgate assembly 14. Alternatively or additionally, the switch or detector 140 may be provided in the form of one or more detectors, e.g., one or more motion detectors, one or more wireless signal receivers, and/or the like, configured to detect motion and/or wireless command signals, e.g., received from a transmitter fob, smart phone or other electronic device, which the processor(s) or controller(s) 112 may be configured to decipher or otherwise process to control the various positions of the tailgate assembly 14. In some alternate embodiments, the switch or detector 140 may be operatively coupled to the power tailgate control module 120, or to the trailer hitch detection module 60, (as shown by dashed-line connections in FIG. 7) instead of, or in addition to, being operatively coupled to the vehicle control module 110. In any case, the switch or detector 140 is configured to produce one or more tailgate activation signals, in response to user activation thereof, which correspond to a desired position of the tailgate assembly, e.g., closed, partially open, fully open, etc.

In some embodiments, the vehicle control module 110 is, in addition or instead of being operatively coupled to the power tailgate control module 120 and/or the switch/detector 140, operatively coupled to at least one notification device 150. The notification device(s) 150 may illustratively be or include any conventional visual, audible and/or tactile notification device mounted to the motor vehicle, e.g., in the operator compartment or other location within or on the motor vehicle. In some alternate embodiments, the notification device(s) 150 may be operatively coupled to the trailer hitch detection module 60 or to the power tailgate control module 120 (as shown by dashed-line connections in FIG. 7) instead of, or in addition to, being operatively coupled to the vehicle control module 110. In any case, in embodiments which include the notification device(s) 150, the processor(s) or controller(s) 112 and/or the processor(s) or controller(s) $66_1$ is/are configured (e.g., via instructions stored in the respective memory unit(s) 114, 662) to control operation, i.e., activation and deactivation, of the notification device(s) 150 based on whether, or not, a trailer hitch assembly 30 is received, i.e., installed inserted or mounted, in the trailer hitch receiver 16.

In some embodiments in which the motor vehicle in which the system 100 is mounted includes a trailer hitch receiver 16 mounted thereto and a power tailgate assembly including one or more components which, when deployed to one or more positions or configurations, may contact at least a portion of a trailer hitch assembly 30 received in the trailer hitch receiver 16 of the motor vehicle, such as illustrated in FIGS. 1B and 2B with the example power tailgate assembly 14 (but not limited to this example tailgate assembly), the system 100 is illustratively configured to disable deployment of such a tailgate assembly to one or more such positions or deployed configurations thereof. In one such embodiment, the trailer hitch detection module 60 and the switch/detector 140 are operatively coupled only to the vehicle control module 110. In this embodiment, the processor(s) or controller(s) $66_1$ of the trailer hitch detection module 60 is/are operable, as described above, to produce the one or more trailer hitch detection signals which is/are indicative of whether or not a trailer hitch assembly is received in the trailer hitch receiver 16, and to provide such signal(s) to the vehicle control module 110 via the wires or cables 70. The processor(s) or controller(s) 112 of the vehicle control module 110 is, in turn, operable (e.g., via execution of corresponding instructions stored in the memory unit(s) 114) to monitor the switch or detector 140 for receipt therefrom of the one or more tailgate activation signals.

Upon receipt of a tailgate activation signal(s) from the switch or detector 140, the processor(s) or controller(s) 112 of the vehicle control computer 110 is/are operable to determine from the tailgate activation signal(s) whether this signal(s) corresponds to a user command to deploy the power tailgate assembly to any position or configuration in which one or more components of the power tailgate assembly may contact at least a portion of a trailer hitch assembly 30 if the trailer hitch assembly 30 is presently received, i.e., installed, inserted or mounted, in the trailer hitch receiver 16 of the motor vehicle. If so, and if trailer hitch detection signal(s) produced by the trailer hitch detection module 60 correspond(s) to detection of the trailer hitch assembly 30 presently received, i.e., installed, inserted or mounted, in the trailer hitch receiver 16, the processor(s) or controller(s) 112 of the vehicle control computer 110 is operable to disable such deployment by not passing the tailgate activation signal(s) or other corresponding command(s) to the power tailgate control module 120 for corresponding control by the processor(s) or controller(s) 122 of the motor driver circuit(s) 126 or, in embodiments in which the processor(s) or controller(s) 112 is/are operatively coupled directly to the motor driver circuit(s) 126 by not commanding the motor driver circuit(s) 126 to drive the tailgate driver motor(s) 130 to deploy the power tailgate assembly 14 in accordance with the tailgate activation signal(s) or other corresponding command(s). If instead the trailer hitch detection signal(s) produced by the trailer hitch detection module 60 correspond(s) to no trailer hitch assembly 30 presently received, i.e., installed, inserted or mounted, in the trailer hitch receiver 16, or if the tailgate activation signal(s) from the switch or detector 140 correspond(s) to a user command(s) to deploy the power tailgate assembly to any position other than that (or those) in which one or more components of the power tailgate assembly may contact at least a portion of a trailer hitch assembly 30 if the trailer hitch assembly 30 is presently received in the trailer hitch receiver 16 of the motor vehicle, the processor(s) or controller(s) 112 of the vehicle control computer 110 is/are operable to execute the commanded deployment of the power tailgate assembly by passing the tailgate activation signal(s), or other corresponding command(s), to the power tailgate control module 120 for corresponding control by the processor(s) or controller(s) 122 of the driver circuit(s) 126 or, in embodiments in which the processor(s) or controller(s) 112 is/are operatively coupled directly to the driver circuit(s) 126, by commanding the driver circuit(s) 126 to drive the tailgate drive motor(s)

and/or actuate the power latch(es) 130 to deploy the power tailgate assembly 14 in accordance with the tailgate activation signal(s) or other corresponding command(s). In the former case, the processor(s) or controller(s) 122 of the power tailgate control module 120 is/are operable (e.g., via execution of corresponding instructions stored in the memory unit(s) 124) to command, based on the tailgate activation signal(s) or other corresponding command(s) received from the processor(s) or controller(s) 112 of the vehicle control module 110, to command the driver circuit(s) 126 to drive the tailgate drive motor(s) and/or actuate the latch(es) 130 to deploy the power tailgate assembly 14 in accordance with the received tailgate activation signal(s) or other corresponding command(s). In an alternate version of this embodiment, the processor(s) or controller(s) 66₁ of the trailer hitch detection module 60 is/are operable to monitor the switch or detector 140 for receipt therefrom of the one or more tailgate activation signals, and to also make the determination, as the processor(s) or controller(s) 112 does/do in the embodiment just described, as to whether to pass the tailgate activation signal(s) or other corresponding command(s) to the processor(s) or controller(s) of the vehicle control module 110.

In one variant of the embodiment just described, the trailer hitch detection module 60 and the switch/detector 140 are operatively coupled only to the power tailgate control module 120 (i.e., and not to the vehicle control module 110). In such embodiments, the processor(s) or controller(s) 66₁ of the trailer hitch detection module 60 is/are operable, as described above, to produce the one or more trailer hitch detection signals which is/are indicative of whether or not a trailer hitch assembly is received in the trailer hitch receiver 16, and to provide such signal(s) to the power tailgate control module 120 via the wires or cables 70, the processor(s) or controller(s) 112 of the vehicle control module 110 is/are operable to monitor the switch or detector 140 for receipt therefrom of the one or more tailgate activation signals and to pass such signals or other corresponding command(s) to the processor(s) or controller(s) of the power tailgate control module 120, and the processor(s) or controller(s) 122 of the power tailgate control module 120 is/are operable to execute all of the remaining functions described above. In an alternate variant of the embodiment described above, the power tailgate control module 120 is/are operable to monitor the switch or detector 140 for receipt therefrom of the one or more tailgate activation signals, and the processor(s) or controller(s) 122 of the power tailgate control module 120 is/are operable to execute all of the functions described above except for those executed by the trailer hitch detection module 60.

In another variant of the embodiment described above, the switch/detector 140 is operatively coupled only to the trailer hitch detection module 60 (and not to either module 110, 120), and the trailer hitch detection module 60 is operatively coupled only to the power tailgate control module 120 (i.e., and not to the vehicle control module 110). In this variant, the processor(s) or controller(s) 66₁ of the trailer hitch detection module 60 is/are operable, as described above, to produce the one or more trailer hitch detection signals which is/are indicative of whether or not a trailer hitch assembly is received in the trailer hitch receiver 16, to monitor the switch or detector 140 for receipt therefrom of the one or more tailgate activation signals, and to also make the determination as to whether to pass the tailgate activation signal(s) or other corresponding command(s) to the power tailgate control module 120 or directly to the driver circuit(s) 126.

In some embodiments in which the motor vehicle in which the system 100 is mounted includes a trailer hitch receiver 16 and power tailgate assembly including one or more components which, when deployed to one or more positions or configurations, may contact at least a portion of a trailer hitch assembly 30 received in the trailer hitch receiver 16 of the motor vehicle, such as illustrated in FIGS. 1B and 2B with the example power tailgate assembly 14 (but not limited to this example tailgate assembly) and/or in which the motor vehicle in which the system 10 is mounted does not include such a power tailgate but does include a trailer hitch assembly 30, the system 100 is illustratively configured to control the notification device(s) 150 to provide for notification to an operator and/or one or more passengers of the motor vehicle of whether or not the trailer hitch assembly 30 is received, i.e., installed, inserted or mounted, in the trailer hitch receiver 16. In addition to, or alternatively to, the various control embodiments and variants described above, the processor(s) or controller(s) 66₁, 112, 122 of one or more of the trailer hitch detection module 60, the vehicle control module 110 and the power tailgate control module 120 may be operable to control the notification device(s) to provide for notification that the trailer hitch assembly 30 is received, i.e., installed, inserted or mounted, in the trailer hitch receiver 16 and/or to provide notification that that the trailer hitch assembly 30 is not received, i.e., installed, inserted or mounted, in the trailer hitch receiver 16, depending upon the trailer hitch detection signal(s) produced by the processor(s) or controller(s) 66₁ of the trailer hitch detection module 60.

While this disclosure has been illustrated and described in detail in the foregoing drawings and description, the same is to be considered as illustrative and not restrictive in character, it being understood that only illustrative embodiments thereof have been shown and described and that all changes and modifications that come within the spirit of this disclosure are desired to be protected.

What is claimed is:

1. A trailer hitch detection system for a motor vehicle, comprising:
    a sensor mounted in or over an opening defined through a wall, and into an interior, of a trailer hitch receiver mounted to the motor vehicle, the sensor responsive to receipt of a ball mount of a trailer hitch assembly in the trailer hitch receiver to exhibit at least a first sensor characteristic, and to an absence of the ball mount of the trailer hitch assembly in the trailer hitch receiver to exhibit at least a second sensor characteristic discernably different from the first sensor characteristic, and
    signal processing circuitry operatively coupled to the sensor and configured to produce at least one trailer hitch detection signal, the at least one trailer hitch detection signal indicating receipt of the ball mount of the trailer hitch assembly in the trailer hitch receiver in response to the first sensor characteristic and indicating absence of the ball mount of the trailer hitch assembly in the trailer hitch receiver in response to the second sensor characteristic.

2. The trailer hitch detection system of claim 1, further comprising:
    at least one notification device mounted to the motor vehicle, and
    at least one processor or controller responsive to the at least one trailer hitch detection signal indicating receipt of the ball mount of the trailer hitch assembly in the trailer hitch receiver to control the at least one notification device to provide a notification thereof.

3. The trailer hitch detection system of claim 2, wherein the at least one processor or controller is responsive to the at least one trailer hitch detection signal indicating the absence of the ball mount of the trailer hitch assembly in the trailer hitch receiver to control the at least one notification device to provide a notification thereof.

4. The trailer hitch detection system of claim 1, wherein the motor vehicle includes a power tailgate assembly mounted thereto and at least one drive motor for driving the power tailgate assembly between a closed position and one or more open positions of the power tailgate assembly or at least one latch for controlling the power tailgate assembly between a latched state and an unlatched state, wherein at least one component of the power tailgate assembly in at least one of the one or more open positions of the power tailgate assembly will contact the trailer hitch assembly with the ball mount received in the trailer hitch receiver, and wherein the system comprises:

a switch or detector responsive to manual user activation to produce at least one tailgate activation signal to command the power tailgate assembly to the closed or one of the one or more open positions, and at least one processor or controller responsive to the at least one trailer hitch detection signal indicating receipt of the ball mount of the trailer hitch assembly in the trailer hitch receiver and to the at least one tailgate activation signal corresponding to a command of the power tailgate assembly to the at least one of the one or more open positions to disable the at least one drive motor from driving the power tailgate assembly to the at least one of the one or more open positions or to disable the at least one latch from unlatching the power tailgate assembly.

5. The trailer hitch detection system of claim 1, wherein the sensor is one of an electromagnetic coil sensor and a capacitive proximity sensor.

6. The trailer hitch detection system of claim 1, further comprising a housing in which the sensor and the signal processing circuitry are mounted, wherein at least a portion of the housing is configured to be received within the opening defined through the wall of the trailer hitch receiver.

7. The trailer hitch detection system of claim 6, wherein the sensor is mounted to a circuit board, and the circuit board is mounted to a bottom wall of the housing with the sensor positioned in the at least a portion of the housing, and wherein the at least a portion of the housing is configured for receipt within the opening with the bottom wall of the at least the portion of the housing co-planar with an inner surface of the trailer hitch receiver.

8. The trailer hitch detection system of claim 7, wherein the signal processing circuitry is mounted to the circuit board.

9. The trailer hitch detection system of claim 8, wherein the entire housing is configured for receipt within the opening defined through the wall of the trailer hitch receiver.

10. The trailer hitch detection system of claim 8, wherein the signal processing circuitry is mounted to the circuit board, and wherein the circuit board is mounted to a bottom wall of the housing with the sensor positioned in the at least a portion of the housing and with the signal processing circuitry positioned in another portion of the housing that is not received within the opening.

11. The trailer hitch detection system of claim 7, the circuit board to which the sensor is mounted is a first circuit board, and further comprising a second circuit board, mounted to the housing and operatively coupled to the first circuit board, to which the signal processing circuitry is mounted.

12. A trailer hitch detection system for a motor vehicle, comprising:

a sensor mounted in or over an opening defined through a wall, and into an interior, of a trailer hitch receiver mounted to the motor vehicle, the sensor responsive to receipt of a ball mount of a trailer hitch assembly in the trailer hitch receiver to produce at least a first sensor characteristic, and to an absence of the ball mount of the trailer hitch assembly in the trailer hitch receiver to produce at least a second sensor characteristic discernably different from the first sensor characteristic, signal processing circuitry operatively coupled to the sensor and configured to produce at least a first trailer hitch detection signal in response to the first sensor characteristic and to produce at least a second trailer hitch detection signal, distinguishable from the first trailer hitch detection signal, in response to the second sensor characteristic, at least one notification device, and at least one processor or controller responsive to at least one of the first trailer hitch detection signal and the second trailer hitch detection signal to control the at least one notification device to provide a notification of a respective one of receipt of the ball mount of the trailer hitch assembly in the trailer hitch receiver and an absence of the ball mount of the trailer hitch assembly in the trailer hitch receiver.

13. The trailer hitch detection system of claim 12, wherein the sensor is an electromagnetic coil sensor.

14. The trailer hitch detection system of claim 12, wherein the sensor is a capacitive proximity sensor.

15. The trailer hitch detection system of claim 12, further comprising a housing in which the sensor and the signal processing circuitry are mounted, wherein at least a portion of the housing is configured for receipt within the opening defined through the wall of the trailer hitch receiver, and wherein the sensor is mounted to a circuit board, and the circuit board is mounted to the housing with the sensor positioned in the at least a portion of the housing, and wherein the at least a portion of the housing is configured for receipt within the opening defined through the trailer hitch receiver.

16. A trailer hitch detection system for a motor vehicle, comprising:

a sensor mounted in or over an opening defined through a wall, and into an interior, of a trailer hitch receiver mounted to the motor vehicle, the sensor responsive to receipt of a trailer hitch assembly in the trailer hitch receiver to produce at least a first sensor characteristic, and to an absence of the trailer hitch assembly in the trailer hitch receiver to produce at least a second sensor characteristic discernably different from the first sensor characteristic, signal processing circuitry operatively coupled to the sensor and configured to produce at least a first trailer hitch detection signal in response to the first sensor characteristic and to produce at least a second trailer hitch detection signal, distinguishable from the first trailer hitch detection signal, in response to the second sensor characteristic, at least one drive motor for driving a power tailgate assembly operatively mounted to the motor vehicle between a closed position and one or more open positions or at least one power latch for controlling the power tailgate assembly between a latched state and an unlatched state, wherein at least one component of the power tailgate assembly in at least one of the one or more open positions of the power tailgate assembly will contact the trailer hitch assembly received in the trailer hitch receiver, a switch or detector responsive to manual user activation to produce at least one tailgate activation signal to command the power tailgate assembly to the closed or any of the one or more open positions, and at least one processor or controller responsive to the first trailer hitch detection signal and to the at least one tailgate activation signal corresponding to a command of the power tailgate assembly to the at least one of the one or more open positions to disable the at least one drive motor from driving the power tailgate assembly to the at least one of the one or more open positions or to disable the at least one latch from unlatching the tailgate assembly.

17. The trailer hitch detection system of claim 16, wherein the sensor is an electromagnetic coil sensor.

18. The trailer hitch detection system of claim 16, wherein the sensor is a capacitive proximity sensor.

19. The trailer hitch detection system of claim 16, further comprising:
   at least one notification device,
   wherein the at least one processor or controller is responsive to at least one of the first trailer hitch detection signal and the second trailer hitch detection signal to control the at least one notification device to provide a notification of a respective one of receipt of the trailer hitch assembly in the trailer hitch receiver and an absence of the trailer hitch assembly in the trailer hitch receiver.

20. The trailer hitch detection system of claim 16, further comprising a housing in which the sensor and the signal processing circuitry are mounted,
   wherein at least a portion of the housing is configured for receipt within the opening defined through the wall of the trailer hitch receiver,
   and wherein the sensor is mounted to a circuit board, and the circuit board is mounted to the housing with the sensor positioned in the at least a portion of the housing,
   and wherein the at least a portion of the housing is configured for receipt within the opening defined through the trailer hitch receiver.

* * * * *